US012792454B2

(12) United States Patent
Wu

(10) Patent No.: US 12,792,454 B2
(45) Date of Patent: Nov. 10, 2026

(54) PROCESSOR CORE FAULT HANDLING METHOD AND APPARATUS, DEVICE, AND STORAGE MEDIUM

(71) Applicant: Huawei Technologies Co., Ltd., Shenzhen (CN)

(72) Inventor: Jun Wu, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 39 days.

(21) Appl. No.: 18/970,444

(22) Filed: Dec. 5, 2024

(65) Prior Publication Data

US 2025/0094273 A1 Mar. 20, 2025

Related U.S. Application Data

(63) Continuation of application No. PCT/CN2023/098855, filed on Jun. 7, 2023.

(30) Foreign Application Priority Data

Jun. 7, 2022 (CN) ......................... 202210641818.6

(51) Int. Cl.
*G06F 11/00* (2006.01)
*G06F 11/07* (2006.01)

(52) U.S. Cl.
CPC ...... *G06F 11/0793* (2013.01); *G06F 11/0724* (2013.01); *G06F 11/0751* (2013.01)

(58) Field of Classification Search
CPC ............. G06F 11/0793; G06F 11/0724; G06F 11/0751
See application file for complete search history.

(56) References Cited

U.S. PATENT DOCUMENTS 6,516,429 B1 2/2003 Bossen et al.
7,730,456 B2 6/2010 Okawa et al.
2005/0055674 A1* 3/2005 Shidla ........................ G06F 8/41 717/131
2008/0162988 A1 7/2008 Zorek et al.
2008/0163014 A1* 7/2008 Crawford ............ G06F 11/1064 714/723
2014/0068792 A1* 3/2014 Kondou .................. G06F 21/70 726/30
2014/0089732 A1 3/2014 Busaba et al.
2022/0156075 A1* 5/2022 Lewis ................... G06F 3/0683

FOREIGN PATENT DOCUMENTS

CN 105204952 A 12/2015
CN 108139928 A 6/2018
EP 3812900 A1 4/2021

* cited by examiner

*Primary Examiner* — Jason B Bryan

(74) *Attorney, Agent, or Firm* — Slater Matsil, LLP

(57) ABSTRACT

A processor core fault handling method and apparatus, a device, and a storage medium, where the method includes: performing fault detection on a plurality of cores of a processor to determine a faulty core as a target core; further, updating, based on a target task executed by the target core, tasks executed by the plurality of cores, to enable a core other than the target core in the plurality of cores to execute the target task; and controlling the core other than the target core in the plurality of cores to execute an updated task, and bringing the target core offline.

20 Claims, 6 Drawing Sheets

PROCESSOR CORE FAULT HANDLING METHOD AND APPARATUS, DEVICE, AND STORAGE MEDIUM

CROSS-REFERENCE TO RELATED APPLICATIONS

This application is a continuation of International Application No. PCT/CN2023/098855, filed on Jun. 7, 2023, which claims priority to Chinese Patent Application No. 202210641818.6, filed on Jun. 7, 2022. The disclosures of the aforementioned applications are hereby incorporated by reference in their entireties.

TECHNICAL FIELD

This application relates to the field of processor technologies, and in particular, to a processor core fault handling method and apparatus, a device, and a storage medium.

BACKGROUND

With continuous development of a processor manufacturing process, a processor disposed in a computing device can integrate more cores, to complete an increasingly complex computing task. However, although an increase in a quantity of cores of the processor can improve a computing capability of the computing device, when a core of the processor is faulty, a data error or data damage is usually caused.

In a related technology, when the computing device is started, a basic input/output system (BIOS) is run to initiate self-detection, and a detected faulty core is isolated.

However, when a core fault occurs in a running process of an operating system after the operating system is started, this manner cannot implement core isolation in the running process of the operating system of the computing device. Consequently, reliability of the processor is low.

SUMMARY

Embodiments of this application provide a processor core fault handling method and apparatus, a device, and a storage medium, to effectively improve reliability of a processor. The technical solutions are as follows.

According to a first aspect, a processor core fault handling method is provided. The method includes:

- performing fault detection on a plurality of cores of a processor to determine a target faulty core;
- updating, based on a target task executed by the target core, tasks executed by the plurality of cores, to enable a core other than the target core in the plurality of cores to execute the target task; and
- controlling the core other than the target core in the plurality of cores to execute an updated task, and bringing the target core offline.

Fault detection is performed on the plurality of cores of the processor to determine the faulty target core. Further, the tasks executed by the plurality of cores are updated based on the target task executed by the target core, to enable the core other than the target core in the plurality of cores to execute the target task. The core other than the target core in the plurality of cores is controlled to execute the updated task, and the target core is brought offline. This implements online isolation of the faulty core, so that the processor can run normally before and after the faulty core is isolated, and reliability of the processor is effectively improved.

In an implementation, the updating, based on a target task executed by the target core, tasks executed by the plurality of cores, to enable a core other than the target core in the plurality of cores to execute the target task includes: updating, based on the target task, a core for executing the target task in core allocation information, where the core allocation information indicates the plurality of cores and the tasks executed by the plurality of cores; and the controlling the core other than the target core in the plurality of cores to execute an updated task, and bringing the target core offline includes: controlling the core other than the target core in the plurality of cores to execute the task based on updated core allocation information, and bringing the target core offline.

In the foregoing manner, the core for executing the target task is updated in the core allocation information, so that the target task is transferred from the target core to another core. This provides a basis for online isolation of the target core.

In an implementation, the controlling the core other than the target core in the plurality of cores to execute an updated task, and bringing the target core offline includes:

controlling the plurality of cores to end current tasks, controlling the core other than the target core in the plurality of cores to execute the updated task, and bringing the target core offline.

In the foregoing manner, the plurality of cores are controlled to execute the updated tasks after executing the current tasks. This process may also be understood as a process of killing a thread currently run by the core and restarting a thread based on the updated task, so that the processor can run normally before and after the faulty core is isolated.

In an implementation, the updating, based on the target task executed by the target core, a core for executing the target task in core allocation information includes:

- determining, based on the core allocation information, a first core from cores other than the target core in the plurality of cores; and
- updating, based on the first core and the target task, the target task in the core allocation information to be executed by the first core.

The core allocation information is updated, and when it is determined that the target core is faulty, the target task executed by the target core is updated to be executed by the first core. This improves the reliability of the processor.

In an implementation, the updating, based on the target task executed by the target core, a core for executing the target task in core allocation information includes:

- determining, based on the core allocation information, a second core from a target core group; and
- updating, based on the second core and the target task, the target task in the core allocation information to be executed by the second core, and updating an execution status of a second task executed by the second core in the core allocation information to non-execution status.

The target core group is a core group in which a quantity of cores can be reduced. The core allocation information is updated, and when it is determined that the target core is faulty, the target task executed by the target core is updated to be executed by the second core in the target core group. This improves the reliability of the processor.

In an implementation, the updating, based on the second core and the target task, the target task in the core allocation information to be executed by the second core, and updating an execution status of a second task executed by the second core in the core allocation information to non-execution status includes any one of the following:

updating, based on the second core and the target task, the target task in the core allocation information to be executed by the second core by running a thread based on a target thread identifier, and updating the execution status of the second task in the core allocation information to non-execution status, where the target thread identifier is a thread identifier of a thread that is run by the target core when the target core executes the target task; and exchanging, based on the second core and the target task, the target task and the second task in the core allocation information, updating the target task in the core allocation information to be executed by the second core by running the thread based on the target thread identifier, and updating the second task in the core allocation information to creating a thread based on a core identifier of the second core without executing the second task.

In the first manner of updating the core allocation information, a sequence of the plurality of cores and a sequence of a plurality of tasks remain unchanged before and after the core allocation information is updated. An execution core of the target task and the execution status of the second task are updated in the core allocation information, to indicate a computing device to subsequently bind the target task to the second core; and the second task is not executed, so that the second core can run the thread based on the target thread identifier, to execute the target task. This implements that a thread identifier corresponding to the target task remains unchanged before and after the faulty core is isolated online, improves the reliability of the processor, and implements insensibility of an upper-layer application.

In the second manner of updating the core allocation information, a sequence of the target task and the second task in the core allocation information is adjusted. The execution core of the target task, a thread identifier corresponding to the target task, the execution status of the second task, and a thread identifier corresponding to the second task are updated in the core allocation information, to indicate the computing device to subsequently bind the target task to the second core; and the second task is not executed, so that the second core can run the thread based on the target thread identifier, to execute the target task. This implements that the thread identifier corresponding to the target task remains unchanged before and after the faulty core is isolated online, improves the reliability of the processor, and implements the insensibility of the upper-layer application.

In an implementation, the controlling the core other than the target core in the plurality of cores to execute the task based on updated core allocation information includes:

creating a plurality of threads based on the updated core allocation information and core identifiers of the plurality of cores, where a thread identifier of a thread run by the second core is a target thread identifier; and binding a thread corresponding to the target task in the plurality of threads to the second core, and controlling the core other than the target core in the plurality of cores to run, based on the updated core allocation information, a thread other than a thread corresponding to the second task in the plurality of threads.

The plurality of threads are recreated, the thread corresponding to the target task in the plurality of threads is bound to the second core, and the thread corresponding to the second task is not executed, to ensure that a total quantity of cores is consistent with a total quantity of threads and that the second core can run the thread based on the target thread identifier, to execute the target task. This implements that a thread identifier corresponding to the target task remains unchanged before and after the faulty core is isolated online, improves the reliability of the processor, and implements the insensibility of the upper-layer application.

In an implementation, the updating, based on the target task executed by the target core, a core for executing the target task in core allocation information includes:

when the target core belongs to a target core group, updating an execution status of the target task in the core allocation information to non-execution status.

In this manner, because the target core group to which the target core belongs is a core group in which a quantity of cores can be reduced, the target core can be directly brought offline. This improves online isolation efficiency of the faulty core on a basis of ensuring that performance of the processor falls within a controllable range.

In an implementation, the performing fault detection on a plurality of cores of a processor to determine a faulty core as a target core includes:

collecting statistics on cache errors reported by the plurality of cores, to obtain first fault detection results of the plurality of cores, where the first fault detection result indicates a quantity of cache errors reported by the core; and if a first fault detection result of the target core indicates that a quantity of cache errors reported by the target core reaches a target threshold, determining that the target core is faulty.

In the foregoing manner, statistics are collected on cache errors reported by a core, and whether the core is faulty can be determined based on the cache errors generated by the core, so that after it is determined that the core is faulty, online isolation is performed on the core. This improves fault detection efficiency. This process may also be understood as follows: When a quantity of the cache errors generated by the core reaches a specific threshold, it is considered that the core is faulty, so that the core is determined as the target core, and online isolation is performed on the core to improve the reliability of the processor.

In an implementation, the performing fault detection on a plurality of cores of a processor to determine a faulty core as a target core includes:

testing at least one performance indicator of the plurality of cores, to obtain second fault detection results of the plurality of cores, where the second fault detection result indicates a test result corresponding to the performance indicator of the core; and if a second fault detection result of the target core indicates that a test result corresponding to at least one performance indicator of the target core is inconsistent with a target result, determining that the target core is faulty.

In the foregoing manner, at least one performance indicator of a core is tested, and whether the core is faulty can be determined based on running performance of the core, so that after it is determined that the core is faulty, online isolation is performed on the core. This improves fault detection efficiency. This process may also be understood as follows: When a test result corresponding to the performance indicator of the core is abnormal, it is considered that the core is faulty, so that the core is determined as the target core, and online isolation is performed on the core to improve the reliability of the processor.

In an implementation, the updating the core allocation information based on the target task executed by the target core includes:

when a quantity of offline cores is less than an offline quantity threshold, updating, based on the target task executed by the target core, the tasks executed by the plurality of cores, to enable the core other than the target core in the plurality of cores to execute the target task.

In this manner, impact on the performance of the processor after the faulty core is isolated online is fully considered, and it can be ensured that the performance of the processor falls within the controllable range. This effectively improves the reliability of the processor.

According to a second aspect, an embodiment of this application provides a processor core fault handling apparatus, including at least one functional module. The at least one functional module is configured to implement the processor core fault handling method in any one of the first aspect or the optional implementations of the first aspect.

According to a third aspect, an embodiment of this application provides a processor. The processor includes a plurality of cores, and when the processor runs on a computing device, the computing device is enabled to perform the processor core fault handling method in any one of the first aspect or the optional implementations of the first aspect.

According to a fourth aspect, an embodiment of this application provides a computing device. The computing device includes a storage and the processor in any one of the first aspect or the optional implementations of the first aspect. The storage is configured to store at least one segment of program code, and the at least one segment of program code is loaded by the processor to perform the processor core fault handling method in any one of the first aspect or the optional implementations of the first aspect.

According to a fifth aspect, an embodiment of this application provides a computer-readable storage medium. The computer-readable storage medium is configured to store at least one segment of program code, and when the at least one segment of program code is run, the processor core fault handling method in any one of the first aspect or the optional implementations of the first aspect is implemented. The storage medium includes but is not limited to a volatile memory, for example, a random access memory, and a non-volatile memory, for example, a flash memory, a hard disk drive (HDD), or a solid state drive (SSD).

According to a sixth aspect, an embodiment of this application provides a computer program product. When the computer program product runs on a computing device, the computing device is enabled to implement the processor core fault handling method in any one of the first aspect or the optional implementations of the first aspect. The computer program product may be a software installation package. When a function of a primary node or a secondary node needs to be implemented, the computer program product may be downloaded and executed on the computing device.

DETAILED DESCRIPTION OF ILLUSTRATIVE EMBODIMENTS

Figure 1:
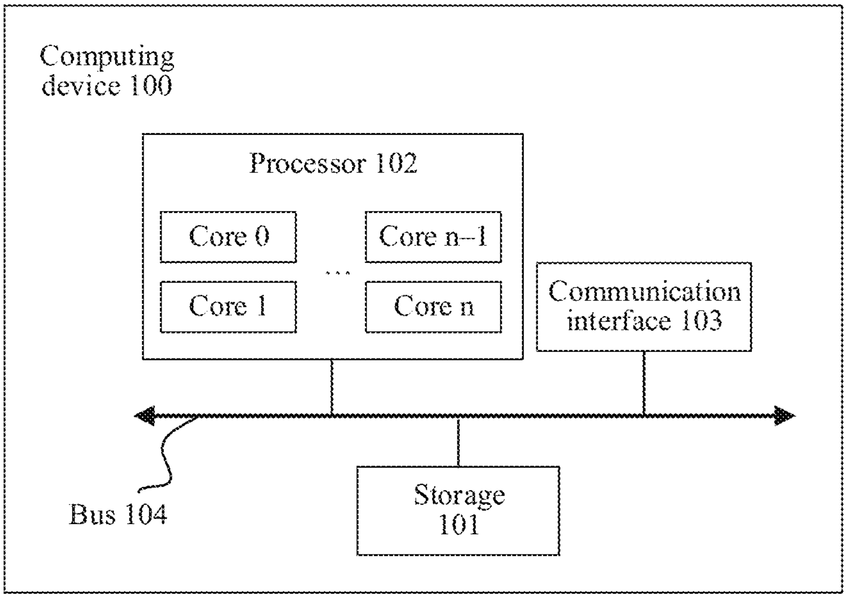
FIG. 1 is a diagram of a hardware structure of a computing device according to an embodiment of this application.

To make the objectives, technical solutions, and advantages of this application clearer, the following further describes in detail the implementations of this application with reference to the accompanying drawings.

For ease of understanding, the following first describes key terms and key concepts in this application.

A multi-core processor is a central processing unit (CPU) integrated with at least two processing cores.

A basic input/output system (BIOS) is a set of programs solidified to a read-only memory (ROM) chip on a motherboard in a computing device, and stores a most important basic input/output program, power on self-detection program, and automatic system startup program of the computing device.

A RAS feature is short for reliability, availability, and serviceability, and is used to ensure that the system runs reliably for as long as possible and is not brought offline, and has a specific fault tolerance mechanism. In some embodiments, a CPU, a memory, and the like of the computing device all have the RAS feature.

A cache error is an error that occurs in a cache of the CPU. In some embodiments, cache errors include a corrected error (CE) and an uncorrected error (UCE).

Silent errors are some errors that cannot be forewarned in a running process of the computing device. A user does not find that data is incorrect or damaged until the computing device is used.

The following describes an application scenario and an implementation environment of embodiments of this application.

Embodiments of this application provide a processor core fault handling method. The method can be applied to a computing device in which a multi-core processor is disposed. Fault detection is performed on a plurality of cores of the processor, and when a faulty target core is determined, online isolation is performed on the target core, to improve reliability of the processor.

For example, the computing device is a terminal, a server, or the like, has a communication function, and can access a wired network or a wireless network. For example, the computing device is the terminal. The terminal is at least one of devices such as a smartphone, a smartwatch, a desktop computer, a laptop computer, a virtual reality terminal, an augmented reality terminal, a wireless terminal, and a laptop portable computer. For example, the computing device is the server. The server is an independent physical server, or a server cluster or a distributed file system including a plurality of physical servers, or a cloud server providing basic cloud computing services such as a cloud service, a cloud database, cloud computing, a cloud function, cloud storage, a network service, cloud communication, a middleware service, a domain name service, a security service, a content delivery network (CDN), and a big data and artificial intelligence platform.

In some embodiments, the foregoing wireless network or wired network uses a standard communication technology and/or protocol. A network includes but is not limited to any combination of a data center network, a storage area network (SAN), a local area network (LAN), a metropolitan area network (MAN), a wide area network (WAN), a mobile network, a wired network, a wireless network, a private network, or a virtual private network. In some implementations, technologies and/or formats including a hypertext markup language (HTML), an extensible markup language (XML), and the like are used to represent data exchanged through the network. In addition, common encryption technologies such as a secure sockets layer (SSL), transport layer security (TLS), a virtual private network (VPN), internet protocol security (IPsec) can also be used to encrypt all or some of links. In some other embodiments, customized and/or dedicated data communication technologies can be used to replace or supplement the data communication technologies described above.

The following describes a hardware structure of the foregoing computing device.

FIG. 1 is a diagram of a hardware structure of a computing device according to an embodiment of this application. As shown in FIG. 1, the computing device 100 includes a storage 101, a processor 102, a communication interface 103, and a bus 104. A communication connection is implemented between the storage 101, the processor 102, and the communication interface 103 through the bus 104.

The storage 101 may be a read-only memory (ROM) or another type of static storage device that can store static information and instructions, a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be configured to carry or store expected program code in a form of instructions or a data structure and that can be accessed by a computer, but is not limited thereto. For example, the storage 101 is configured to store at least one segment of program code. When the program code stored in the storage 101 is executed by the processor 102, the processor 102 is configured to perform the following processor core fault handling method.

The processor 102 may be a network processor (NP), a central processing unit (CPU), an application-specific integrated circuit (ASIC), or an integrated circuit configured to control program execution of the solutions in this application. There may be one or more processors 102. This is not limited. In some embodiments, the processor 102 is a system on chip (SoC). This is not limited in embodiments of this application. In addition, in embodiments of this application, the processor 102 is a multi-core processor, for example, including a core 0, a core 1, . . . , a core n−1, and a core n. n is a positive integer. It may also be understood that there are a plurality of computing engines, and the processor 102 may simultaneously run a plurality of different threads to execute corresponding tasks, where a running queue of one core has only one thread at a same moment. In some embodiments, the processor 102 runs the thread based on core allocation information to perform the corresponding task. For example, the core allocation information may also be understood as a task list of cores, and indicates a plurality of cores and tasks executed by the plurality of cores. In the core allocation information, the plurality of cores are arranged based on consecutive core identifiers (IDs) reported after BIOS initialization. In addition, a thread ID is an ID generated when an operating system creates a thread based on a task in the core allocation information. The thread ID is usually in one-to-one correspondence with the core ID. In other words, when an ID of a core is 1, a thread ID of a thread run by the core is also 1. For example, the core 1, the core 2, and the core 3 in the processor respectively execute a task 1, a task 2, and a task 3. The core 1 runs the thread whose ID is 1 to execute the task 1, the core 2 runs a thread whose ID is 2 to execute the task 2, and the core 3 runs a thread whose ID is 3 to execute the task 3. It should be noted that numbers of the tasks in embodiments of this application are merely used to distinguish between different tasks. In the core allocation information, the different tasks may alternatively be represented by names, other representation forms, or the like. This is not limited herein.

The communication interface 103 uses a transceiver module, for example, a transceiver, to implement communication between the computing device 100 and another device or a communication network. For example, data may be obtained through the communication interface 103.

The storage 101 and the processor 102 may be disposed separately, or may be integrated together.

The bus 104 may include a path for transmitting information between various components (for example, the storage 101, the processor 102, and the communication interface 103) of the computing device 100.

The following describes a processor core fault handling method provided in embodiments of this application.

Figure 2:
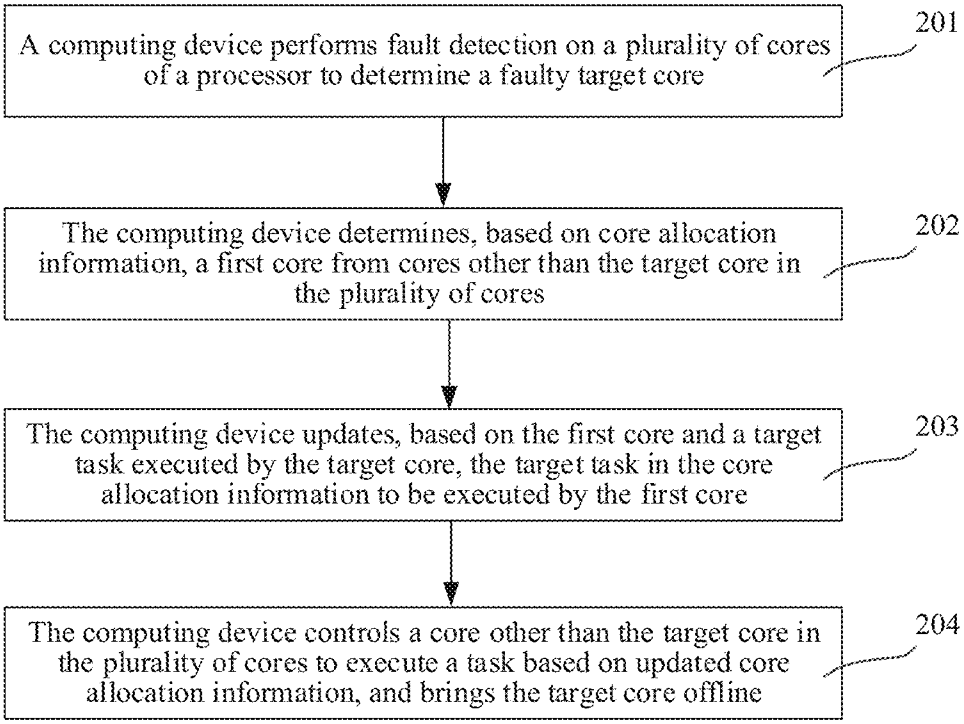
FIG. 2 is a step flowchart of a processor core fault handling method according to an embodiment of this application.

FIG. 2 is a step flowchart of a processor core fault handling method according to an embodiment of this application. As shown in FIG. 2, the processor core fault handling method is applied to the computing device shown in FIG. 1. For example, the processor core fault handling method is performed by an operating system of the computing device, and the operating system is run by a processor on which fault detection is performed. For example, the processor core fault handling method includes the following step 201 to step 204.

201: The computing device performs fault detection on a plurality of cores of the processor to determine a faulty core as a target core.

In this embodiment of this application, the processor is a multi-core processor. The computing device performs fault detection on the plurality of cores of the processor to obtain a fault detection result of each core, and determines, based on the fault detection result of each core, whether a faulty target core exists. The target core is also referred to as a faulty core. In this process, the computing device determines, through fault detection, whether the core of the processor is faulty. The computing device determines the core as the target core once the fault detection result of the core indicates that the core is faulty. For example, a target application program runs on the computing device, and the computing device performs fault detection on the plurality of cores of the processor by using the target application program, to obtain the fault detection result.

The following describes a specific implementation in which the computing device determines the target core. This process includes at least one of the following manners.

In a first manner, the computing device determines the faulty target core based on cache errors reported by the plurality of cores.

The computing device collects statistics on the cache errors reported by the plurality of cores, to obtain first fault detection results of the plurality of cores, where the first fault detection result indicates a quantity of cache errors reported by the core; and if a first fault detection result of the target core indicates that a quantity of cache errors reported by the target core reaches a target threshold, determines that the target core is faulty.

In some embodiments, the plurality of cores of the processor have a RAS feature, and can report, in an interrupt based reporting manner, the cache error that occurs in the core to the operating system when an error occurs in a cache of the core. For example, the cache error is a CE error. For example, the target application program runs on the computing device, and the computing device collects, by using the target application program, statistics on cache errors reported by each core, to obtain the first fault detection result of each core.

In some embodiments, that the quantity of cache errors reported by the target core reaches the target threshold means that a historical total quantity of cache errors reported by the target core reaches the target threshold. To be specific, the computing device continuously collects statistics on the cache errors reported by the plurality of cores, continuously updates the first fault detection result of each core, and if the first fault detection result of the target core indicates that the historical total quantity of cache errors reported by the target core reaches the target threshold, determines that the target core is faulty. For example, the target threshold is 1000. This is not limited.

In some other embodiments, that the quantity of cache errors reported by the target core reaches the target threshold means that a quantity of cache errors reported by the target core within a first time period reaches the target threshold. To be specific, the computing device collects, by using the first time period as a window, statistics on the quantity of cache errors reported by the plurality of cores, updates the first fault detection result of each core at an interval of the first time period, and if the first fault detection result of the target core indicates that the quantity of cache errors reported by the target core within the first time period reaches the target threshold, determines that the target core is faulty. For example, the first time period is 1 minute, and the target threshold is 50. This is not limited in embodiments of this application.

Figure 3:
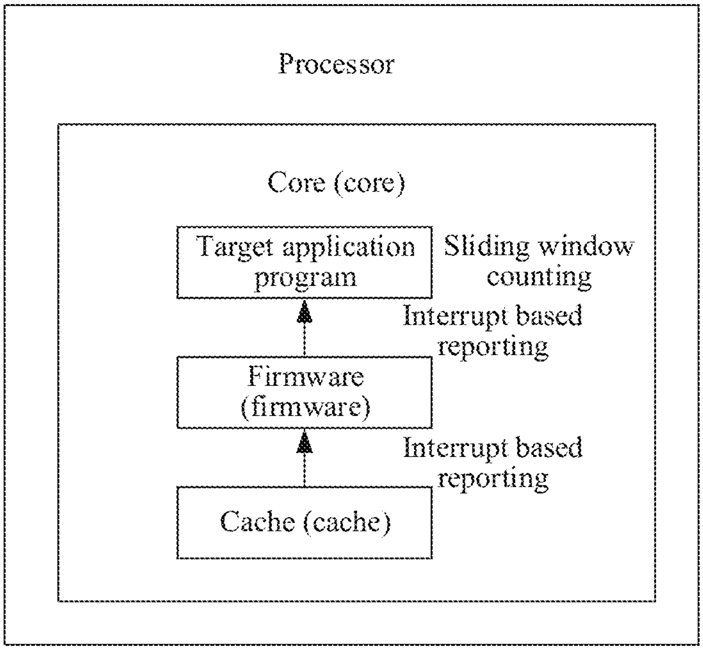
FIG. 3 is a diagram of a fault detection manner according to an embodiment of this application.

For example, FIG. 3 is a diagram of a fault detection manner according to an embodiment of this application. As shown in FIG. 3, the target application program runs on the computing device. The computing device collects, by using the target application program and using the first time period as the window, statistics on cache errors reported by the cache of the core by using firmware (where this process may also be understood as sliding window counting), to obtain the first fault detection result of each core, and if the first fault detection result of the target core indicates that the quantity of cache errors reported by the target core within the first time period reaches the target threshold, determines that the target core is faulty.

In the foregoing first manner, the RAS feature of the processor is used to collect statistics on the cache errors reported by the core, and whether the core is faulty can be determined based on the cache errors generated by the core, so that after it is determined that the core is faulty, online isolation is performed on the core. This improves fault detection efficiency. This process may also be understood as follows: When a quantity of the cache errors generated by the core reaches a specific threshold, it is considered that the core is faulty, so that the core is determined as the target core, and online isolation shown in subsequent step 202 to step 204 is performed on the core to improve reliability of the processor.

In a second manner, the computing device determines the faulty target core based on performance indicator test results of the plurality of cores.

The computing device tests at least one performance indicator of the plurality of cores, to obtain second fault detection results of the plurality of cores, where the second fault detection result indicates a test result corresponding to the performance indicator of the core; and if a second fault detection result of the target core indicates that a test result corresponding to at least one performance indicator of the target core is inconsistent with a target result, determines that the target core is faulty.

In some embodiments, the target result is a preset result, and indicates a normal range corresponding to the performance indicator of the core. The at least one performance indicator includes an instruction execution unit of the core, a register, memory access, a floating-point operation, a single instruction multiple data (SIMD) instruction, a bus, and the like. This is not limited. It should be understood that a quantity of performance indicators tested by the computing device is not limited in embodiments of this application. In addition, examples of the performance indicators herein are merely examples, and all other performance indicators for determining whether the core is faulty can be used in embodiments of this application. In addition, in some embodiments, the computing device tests the at least one performance indicator of the plurality of cores at an interval of a second time period, to obtain the second fault detection results of the plurality of cores. For example, the second time period is 10 minutes. This is not limited. In this manner, whether the faulty target core exists in a current processor can be continuously detected, to perform online isolation on the target core. This improves reliability of the processor.

In some embodiments, the target application program runs on the computing device, and the target application program invokes a test model (pattern) to test the at least one performance indicator of the plurality of cores, to obtain the second fault detection result of each core. For example, when the operating system is started, the computing device applies to the operating system for a target memory by using the target application program, and presets the test model in the target memory. In a running process of the operating system, the computing device invokes the test model to test at least one performance indicator of each core, to obtain the second fault detection result of each core, compares the second fault detection result of each core with the target result, and if the second fault detection result of the target core indicates that the test result corresponding to the at least one performance indicator of the target core is inconsistent with the target result, determines that the target core is faulty. In some embodiments, the computing device can further test, by using the test model, whether a program running on the core deviates from a normal path, to determine the faulty target core. For example, a phenomenon that the program running on the core deviates from the normal running path is also referred to as core run-off.

In some embodiments, if the second fault detection result of the target core indicates that a test result corresponding to any performance indicator of the target core is inconsistent with the target result, it is determined that the target core is faulty. In this manner, when a test of any performance indicator of the target core fails, it is determined that the target core is faulty. This improves the reliability of the processor.

In some other embodiments, if the second fault detection result of the target core indicates that the test result corresponding to a target performance indicator of the target core is inconsistent with the target result, it is determined that the target core is faulty. The target performance indicator is a preset performance indicator, and there may be one or more target performance indicators. This is not limited. In this manner, it is determined that the target core is faulty only when a test of a specified performance indicator of the target core fails, so that a personalized requirement can be met.

Figure 4:
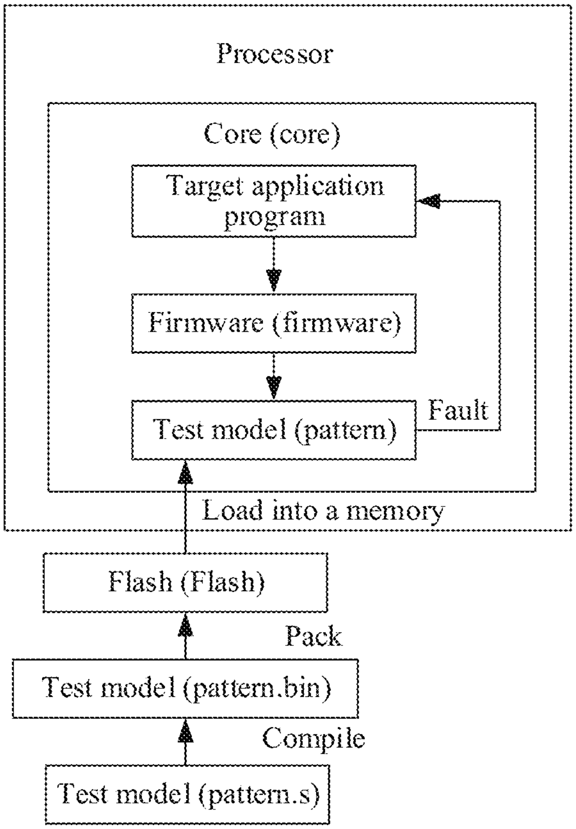
FIG. 4 is a diagram of another fault detection manner according to an embodiment of this application.

For example, FIG. 4 is a diagram of another fault detection manner according to an embodiment of this application. As shown in FIG. 4, the target application program runs on the computing device, a test model (pattern.s) is compiled to obtain a test model (pattern.bin), and the test model is packed into a flash, and then loaded into the target memory. The computing device invokes the test model by using the target application program, test a plurality of performance indicators of each core, to obtain the second fault detection result corresponding to each core, and if the second fault detection result of the target core indicates that a test result corresponding to any performance indicator of the target core is inconsistent with the target result, determines that the target core is faulty.

In the foregoing second manner, the at least one performance indicator of the core is tested, and whether the core is faulty can be determined based on running performance of the core, so that after it is determined that the core is faulty, online isolation is performed on the core. This improves fault detection efficiency. This process may also be understood as follows: When the test result corresponding to the performance indicator of the core is abnormal, it is considered that the core is faulty, so that the core is determined as the target core, and online isolation shown in subsequent step 202 to step 204 is performed on the core to improve the reliability of the processor.

It should be noted that, in some embodiments, the computing device determines the target core in either of the foregoing fault detection manners. In some other embodiments, the computing device synchronously uses the foregoing two fault detection manners to determine the target core. This is not limited in embodiments of this application. In addition, the foregoing two fault detection manners are merely examples, and other fault detection manners of detecting whether the core is faulty can all be used in embodiments of this application.

Through step 201, the computing device determines the faulty target core by performing fault detection on the plurality of cores of the processor. Further, because the target core has been faulty, it can be predicted that a silent error may be generated in the processor if the target core continues to run. To avoid this case, the computing device performs online isolation on the target core through the following step 202 to step 204, to improve the reliability of the processor. The following describes a process in which the computing device performs online isolation on the target core.

202: The computing device determines, based on core allocation information, a first core from cores other than the target core in the plurality of cores.

In this embodiment of this application, the core allocation information indicates the plurality of cores and tasks executed by the plurality of cores, and may also be understood as a task list of the cores. After determining the target core in step 201, the computing device obtains the core allocation information, and determines, based on the core allocation information, the first core from the cores other than the target core in the plurality of cores.

In some embodiments, the first core is any core other than the target core in the plurality of cores. For example, a next core of the target core is used as the first core. This is not limited. In some embodiments, the first core is a core that meets a load condition and that is other than the target core in the plurality of cores. For example, the load condition means that duration of the task executed by the core is the shortest. In this manner, the core that meets the load condition is used as the first core, so that a performance loss of the processor after the core is isolated online can be reduced. This improves the reliability of the processor.

203: The computing device updates, based on the first core and a target task executed by the target core, the target task in the core allocation information to be executed by the first core.

In this embodiment of this application, updated core allocation information indicates that the target task is executed by the first core. For example, the core allocation information indicates that a core 1, a core 2, and a core 3 respectively execute a task 1, a task 2, and a task 3. Through fault detection, the computing device determines that the core 2 is the target core, and obtains the core allocation information to determine that the core 3 is the first core. The task 2 in the core allocation information is updated to be executed by the core 3 (where this may also be understood as that the task 2 is allocated to the core 3), so that the updated core allocation information is obtained. It should be noted that a manner of updating the core allocation information by the computing device is not limited in embodiments of this application, provided that the updated core allocation information can indicate that the target task is executed by the first core. For example, the computing device may indicate, in a manner of adding annotation information to the target task, that the target task is executed by the first core, may indicate, in a manner of adding annotation information to the first core, that the target task is executed by the first core, or may indicate, in a manner of adding annotation information to the entire core allocation information, that the target task is executed by the first core.

In addition, for a first task executed by the first core, in some embodiments, the computing device updates the target task and the first task in the core allocation information to be executed by the first core, so that the computing device can control the first core to execute the target task and the first task in a time division multiplexing manner. This reduces the performance loss after the faulty core is isolated online and improves the reliability of the processor. In some other embodiments, the computing device updates the target task in the core allocation information to be executed by the first core, and updates an execution status of the first task in the core allocation information to non-execution status. That is, the computing device can discard the first task, to improve running efficiency of the processor. A processing manner of the first task is not limited in embodiments of this application.

Through step 202 and step 203, in a manner of updating, in the core allocation information, a core for executing the target task, the computing device updates, based on the target task executed by the target core, the tasks executed by the plurality of cores. For example, this process is "the computing device updates, based on the target task executed by the target core, the tasks executed by the plurality of cores, to enable the core other than the target core in the plurality of cores to execute the target task".

204: The computing device controls the core other than the target core in the plurality of cores to execute the task based on the updated core allocation information, and brings the target core offline.

In this embodiment of this application, after updating the core allocation information, the computing device obtains the updated core allocation information, controls the plurality of cores to end current tasks, controls the core other than the target core in the plurality of cores to execute the task based on the updated core allocation information, and brings the target core offline, to implement the online isolation of the target core. For example, this process is "the computing device controls the core other than the target core in the plurality of cores to execute an updated task, and brings the target core offline".

For example, before the core allocation information is updated, the core allocation information indicates that the core 1, the core 2, and the core 3 respectively execute the task 1, the task 2, and the task 3. After it is determined that the core 2 is the faulty core, the computing device updates the core allocation information. The updated core allocation information indicates that the core 1 and the core 3 respectively execute the task 1 and the task 2, and that the core 2 does not execute a task. In this case, the computing device controls the plurality of cores to end the current tasks, controls the core 1 to execute the task 1, and controls the core 3 to execute the task 2 (where this process may also be understood as a process of killing a thread currently run by the core and restarting a thread based on the updated core allocation information).

Through step 201 to step 204, after determining the faulty target core through fault detection, the computing device updates, based on the target task executed by the target core, the core for executing the target task in the core allocation information, to implement the online isolation of the faulty core. This improves the reliability of the processor, and reduces a possibility that the silent error occurs in the processor.

In some other embodiments, after performing step 201 to determine the target core, the computing device determines a quantity of offline cores. When the quantity of offline cores is less than an offline quantity threshold, step 202 to step 204 are performed. The offline quantity threshold is a preset quantity threshold. For example, the offline quantity threshold is determined based on a quantity of cores of the processor. For example, the quantity of cores of the processor is 32, and the offline quantity threshold is 1; the quantity of cores of the processor is 64, and the offline quantity threshold is 2; the quantity of cores of the processor is 128, and the offline quantity threshold is 4; or the quantity of cores of the processor is 192, and the offline quantity threshold is 8. This is not limited in embodiments of this application. For example, after determining the target core, the computing device determines, based on the core allocation information, the quantity of offline cores, to determine whether the target core is allowed to be brought offline. In this manner, impact on performance of the processor after the faulty core is isolated online is fully considered, and it can be ensured that the performance of the processor falls within a controllable range. This effectively improves the reliability of the processor.

Figure 5:
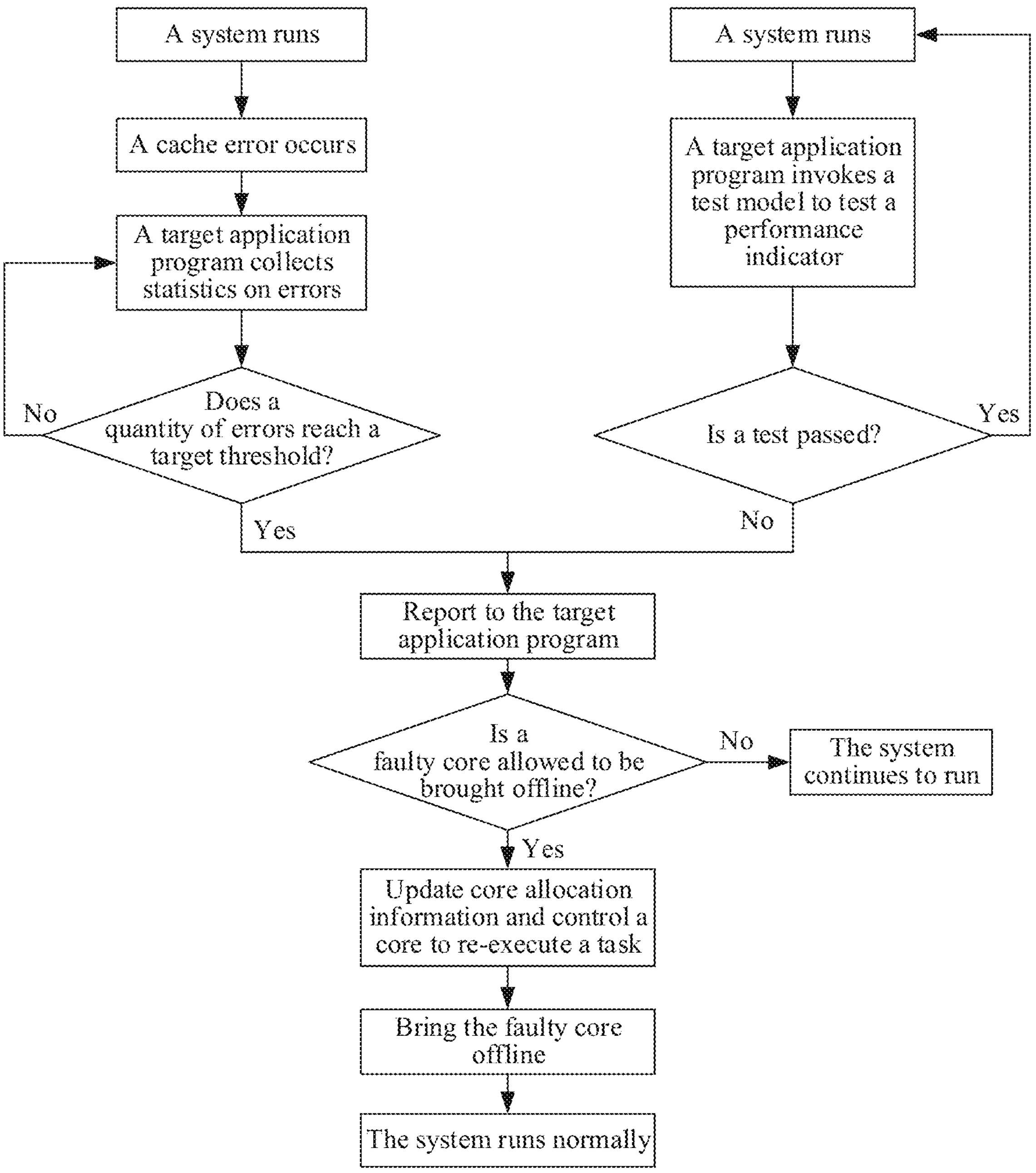
FIG. 5 is a diagram of a processor core fault handling method according to an embodiment of this application.

For example, the embodiment shown in FIG. 2 is described below with reference to FIG. 5. FIG. 5 is a diagram of a processor core fault handling method according to an embodiment of this application. As shown in FIG. 5, an example in which the computing device synchronously uses the foregoing two fault detection manners is used for description. For example, in the running process of the operating system, the computing device collects statistics on the cache errors reported by the plurality of cores, and when a quantity of cache errors of the core reaches the target threshold determines that the core is the faulty core; and the computing device invokes the test model, to test the at least one performance indicator of the plurality of cores, and when a test result of any performance indicator of a core is inconsistent with the target result, determines that the core is the faulty core. After the faulty core is determined, the faulty core is reported to the target application program. Further, the computing device determines, by using the target application program and based on the core allocation information, whether to bring the faulty core offline. If the faulty core is allowed to be brought offline, the computing device updates, based on the target task executed by the faulty core, the core for executing the target task in the core allocation information, to obtain the updated core allocation information, controls the core other than the faulty core in the plurality of cores to execute the task based on the updated core allocation information, and brings the faulty core offline. If the faulty core is not allowed to be brought offline, the computing device continues to run.

In conclusion, in the processor core fault handling method provided in embodiments of this application, fault detection is performed on the plurality of cores of the processor to determine the faulty target core. Further, based on the target task executed by the target core, the core for executing the target task is updated in the core allocation information, to obtain the updated core allocation information, the core other than the target core in the plurality of cores is controlled to execute a corresponding task based on the updated core allocation information, and the target core is brought offline, to implement the online isolation of the faulty core, so that the processor can run normally before and after the faulty core is isolated. This effectively improves the reliability of the processor.

The foregoing embodiments shown in FIG. 2 to FIG. 5 describe the processor core fault handling method provided in this application. In some other embodiments, when a binding relationship exists between the core of the processor and the task, an upper-layer application may check a thread ID of a thread run by the core when the core executes the task. When a thread ID corresponding to a task changes, sometimes a function of the upper-layer application may be unavailable. For example, the core 1, the core 2, and the core 3 respectively execute the task 1, the task 2, and the task 3. The core 1 runs a thread whose ID is 1 to execute the task 1, the core 2 runs a thread whose ID is 2 to execute the task 2, and the core 3 runs a thread whose ID is 3 to execute the task 3. In this process, the computing device generates running data based on the thread whose ID is 2, and the thread ID corresponding to the task 2 sensed by the upper-layer application is 2. When the core 2 is faulty, if execution of the task 2 by the core 2 is directly replaced with execution of the task 2 by the core 3, the core 3 runs the thread whose ID is 3 to execute the task 2, to enable the computing device to continue to generate the running data based on the thread whose ID is 3. As a result, the thread ID corresponding to the task 2 sensed by the upper-layer application is changed from 2 to 3, and the function of the upper-layer application is unavailable. Based on this, an embodiment of this application provides another processor core fault handling method, to ensure that, when the binding relationship exists between the core and the task, before and after the faulty core is isolated, a thread ID of a task corresponding to the faulty core remains unchanged when the task is executed by another core. This improves the reliability of the processor, and implements insensibility of the upper-layer application.

The following describes the processor core fault handling method.

Figure 6:
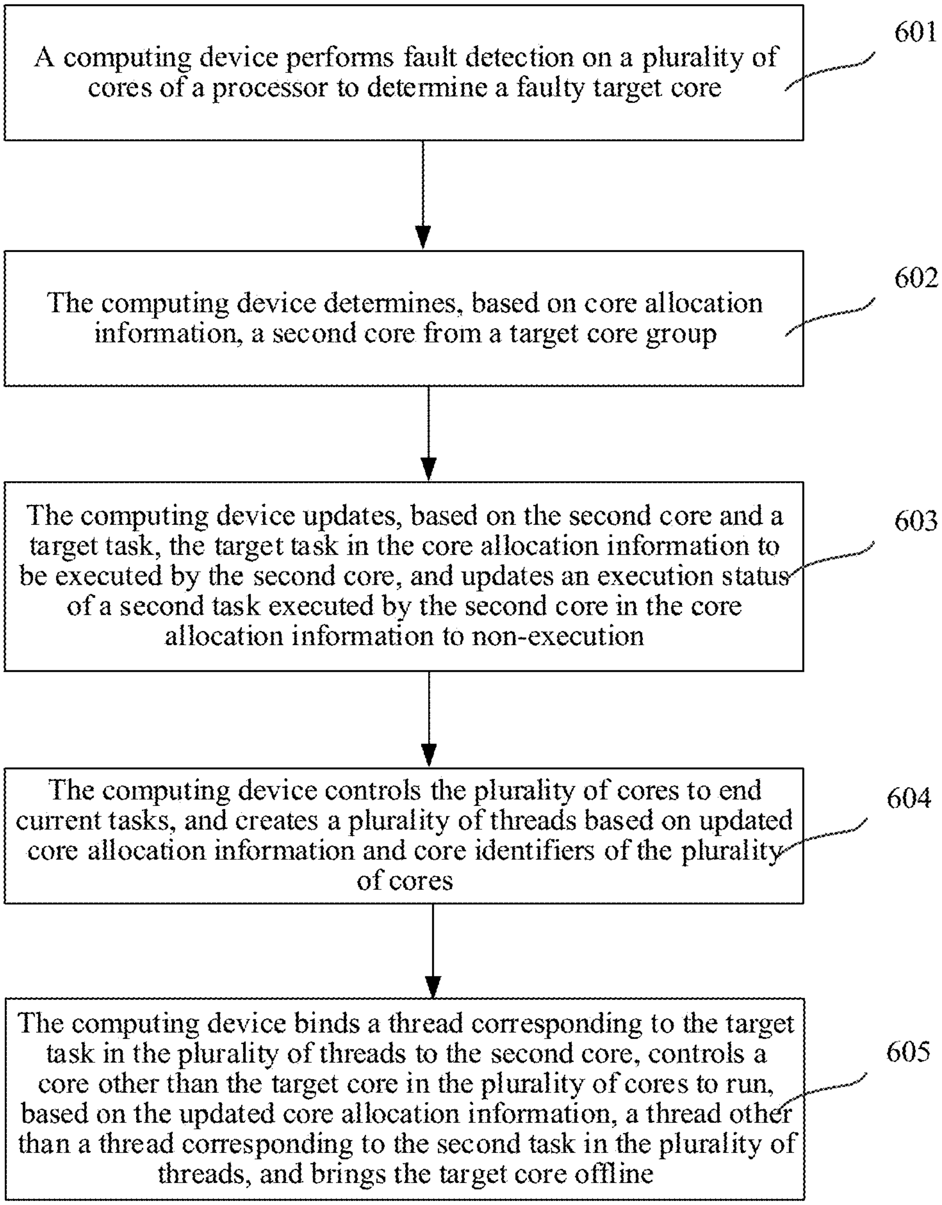
FIG. 6 is a step flowchart of another processor core fault handling method according to an embodiment of this application.

FIG. 6 is a step flowchart of another processor core fault handling method according to an embodiment of this application. As shown in FIG. 6, the processor core fault handling method is applied to the computing device shown in FIG. 1. For example, the processor core fault handling method is performed by an operating system of the computing device, and the operating system is run by a processor on which fault detection is performed. For example, the method includes the following step 601 to step 605.

601: The computing device performs fault detection on a plurality of cores of the processor to determine a faulty core as a target core.

In this embodiment of this application, step 601 is similar to step 201 in the embodiment shown in FIG. 2. Therefore, details are not described herein again.

602: The computing device determines, based on core allocation information, a second core from a target core group.

In this embodiment of this application, the core allocation information further indicates that a binding relationship exists between a core and a task. The target core group is a core group in which a quantity of cores can be reduced, and may also be referred to as a variable core group. A first core is a core other than the target core in the plurality of cores. For example, the plurality of cores are divided into a plurality of core groups. The plurality of core groups include a variable core group and an invariable core group. A quantity of cores in the variable core group is variable, and a quantity of cores in the invariable core group is invariable. In other words, the quantity of cores in the variable core group may be reduced by 1, while the quantity of cores in the invariable core group cannot be reduced. For example, the core allocation information further indicates core groups to which the plurality of cores belong. After determining the target core, the computing device obtains the core allocation information, determines the target core group based on the core allocation information, and determines the second core from the target core group.

In some embodiments, for example, the target core group does not include the target core, and the second core is any core in the target core group. For example, a $1^{st}$ core in the target core group is used as the second core. This is not limited. Alternatively, the second core is a core that meets a load condition in the target core group. For example, the load condition means that duration of the task executed by the core is the shortest. In this manner, the core that meets the load condition in the target core group is used as the second core, so that a performance loss of the processor after a faulty core is isolated online can be reduced. This improves reliability of the processor. It should be understood that, in some embodiments, for example, the target core group includes the target core, and the second core is any core other than the target core in the target core group, or the second core is the core that meets the load condition and that is other than the target core in the target core group. Details are not described herein again.

603: The computing device updates, based on the second core and a target task, the target task in the core allocation information to be executed by the second core, and updates an execution status of a second task executed by the second core in the core allocation information to non-execution status.

In this embodiment of this application, updated core allocation information indicates that the target task is executed by the second core and the second task is not executed. In some embodiments, a manner in which the computing device updates the core allocation information includes any one of the following.

In a first manner, the target task in the core allocation information is updated, based on the second core and the target task, to be executed by the second core by running a thread based on a target thread identifier, and the execution status of the second task in the core allocation information is updated to non-execution status.

The target thread identifier is a thread identifier of a thread run by the target core when the target core executes the target task. In other words, a sequence of the plurality of cores and a sequence of a plurality of tasks remain unchanged before and after the core allocation information is updated. For example, the computing device updates the core allocation information in a manner of adding annotation information to the task. The core allocation information that is not updated indicates a core 1, a core 2, a core 3, a task 1, a task 2, and a task 3. After the core 2 is determined as the target core, the core 3 is determined as the second core, and the core allocation information is updated. The updated core allocation information indicates the core 1, the core 2, the core 3, the task 1, the task 2 (executed by the core 3 by running a thread based on a thread ID 2), and the task 3 (not executed).

In the first manner of updating the core allocation information, the sequence of the plurality of cores and the sequence of the plurality of tasks remain unchanged before and after the core allocation information is updated. In addition, a core for executing the target task and the execution status of the second task are updated in the core allocation information, to indicate the computing device to bind the target task to the second core; and the second task is not executed, so that the second core can run the thread based on the target thread identifier, to execute the target task. This implements that a thread identifier corresponding to the target task remains unchanged before and after the faulty core is isolated online, improves the reliability of the processor, and implements insensibility of an upper-layer application.

In a second manner, the target task and the second task in the core allocation information are exchanged based on the second core and the target task, the target task in the core allocation information is updated to be executed by the second core by running the thread based on the target thread identifier, and the second task in the core allocation information is updated to creating a thread based on a core identifier of the second core without executing the second task.

For example, the computing device updates the core allocation information in a manner of adding annotation information to the task. The core allocation information that is not updated indicates a core 1, a core 2, a core 3, a task 1, a task 2, and a task 3. After the core 2 is determined as the target core, the core 3 is determined as the second core, and the core allocation information is updated. The updated core allocation information indicates the core 1, the core 2, the core 3, the task 1, the task 3 (creating a thread whose ID is 3 without executing the task 3), and the task 2 (creating a thread whose ID is 2 and executing the task 2 by the core 3).

In the second manner of updating the core allocation information, a sequence of the target task and the second task in the core allocation information is adjusted. An execution core of the target task, a thread identifier corresponding to the target task, an execution status of the second task, and a thread identifier corresponding to the second task are updated in the core allocation information, to indicate the computing device to subsequently bind the target task to the second core; and the second task is not executed, so that the second core can run the thread based on the target thread identifier, to execute the target task. This implements that the thread identifier corresponding to the target task remains unchanged before and after the faulty core is isolated online, improves the reliability of the processor, and implements insensibility of the upper-layer application.

It should be noted that examples in the foregoing two manners of updating the core allocation information are merely examples for description. An update manner is not limited in embodiments of this application, provided that the updated core allocation information can indicate that the second core runs the thread based on the target thread identifier, to execute the target task, and does not execute the second task.

In some embodiments, when the target core does not belong to the target core group, the computing device further updates a core group to which the second core belongs in the core allocation information to a core group to which the target core belongs, to ensure that when the target core is subsequently brought offline, a quantity of cores in the core group to which the target core belongs remains unchanged.

Through step 602 and step 603, in a manner of updating, in the core allocation information, the core for executing the target task, the computing device updates, based on the target task executed by the target core, tasks executed by the plurality of cores. For example, this process is "the computing device updates, based on the target task executed by the target core, the tasks executed by the plurality of cores, to enable the core other than the target core in the plurality of cores to execute the target task".

604: The computing device controls the plurality of cores to end current tasks, and creates a plurality of threads based on the updated core allocation information and core identifiers of the plurality of cores.

In this embodiment of this application, the computing device controls the plurality of cores to end the current tasks, and creates the plurality of threads based on a task indicated by the updated core allocation information and the core IDs of the plurality of cores. That is, a quantity of threads created by the computing device is the same as a quantity of cores. In the plurality of threads, a thread identifier of the thread run by the second core is the target thread identifier. In other words, the thread is a thread corresponding to the target task, and the thread identifier of the thread is created based on a core identifier of the target core. A thread identifier of a thread corresponding to the second task is created based on the core identifier of the second core. For example, the updated core allocation information indicates the core 1, the core 2, the core 3, the task 1, the task 2, and the task 3. The core 2 is the target core, and the core 3 is the second core. In this case, the computing device creates a thread (a thread ID 1) corresponding to the task 1 based on a core ID of the core 1, a thread (the thread ID 2) corresponding to the task 2 based on a core ID of the core 2, and a thread (a thread ID 3) corresponding to the task 3 based on a core ID of the core 3.

It should be noted that although step 603 provides two manners of updating the core allocation information, for the updated core allocation information obtained in either of the foregoing manners, the computing device creates a plurality of threads based on the updated core allocation information. In the plurality of threads, all thread identifiers of threads corresponding to the target task are created based on the core identifier of the target core, and all thread identifiers of threads corresponding to the second task are created based on the core identifier of the second core.

In addition, a process in which the computing device controls the plurality of cores to end the current tasks is a process of unbinding the core from the task. Based on this, the computing device recreates a plurality of threads, performs the following step 605 to rebind the core to the thread, and controls the core other than the target core in the plurality of cores to run a corresponding thread, to implement the online isolation of the target core. That is, when creating the plurality of threads, the computing device does not bind the thread to the core.

605: The computing device binds the thread corresponding to the target task in the plurality of threads to the second core, controls the core other than the target core in the plurality of cores to run, based on the updated core allocation information, a thread other than the thread corresponding to the second task in the plurality of threads, and brings the target core offline.

In this embodiment of this application, for the plurality of threads created by the computing device, the computing device binds the thread corresponding to the target task to the second core, binds threads other than the thread corresponding to the target task and the thread corresponding to the second task in the plurality of threads to corresponding cores, controls the core other than the target core in the plurality of cores to run, based on the updated core allocation information, the thread other than the thread corresponding to the second task in the plurality of threads, and brings the target core offline. In other words, for the plurality of threads created by the computing device, only the thread corresponding to the second task is not bound to a core to run, threads corresponding to other tasks are all bound to cores to run, and the thread corresponding to the target task is bound to the second core, so that the second core can run the thread based on the target thread identifier, to execute the target task. This implements that the thread identifier corresponding to the target task remains unchanged before and after the faulty core is isolated online, improves the reliability of the processor, and implements the insensibility of the upper-layer application.

It should be noted that, in the foregoing process, although the computing device creates the thread based on the second task, the computing device does not control the core to run the thread. This may also be understood as not performing any processing on the thread, to ensure that a total quantity of cores of the processor is the same as a total quantity of threads. This ensures that thread identifiers corresponding to tasks remain unchanged before and after the faulty core is isolated online, and improves the reliability of the processor.

For example, before the core allocation information is updated, the core allocation information indicates that the core 1, the core 2, and the core 3 respectively execute the task 1, the task 2, and the task 3. In this process, the task 2 sensed by the upper-layer application corresponds to the thread ID 2. When determining that the core 2 is faulty, the computing device determines the core 2 as the target core, determines the core 3 in the target core group as the second core, and updates the core allocation information. The updated core allocation information indicates that the core 1 and the core 3 respectively execute the task 1 and the task 2, and that the task 3 is not executed. The computing device creates the plurality of threads based on the tasks and core IDs of the plurality of cores that are indicated by the updated core allocation information. The tasks and the core IDs of the plurality of cores are respectively the thread (the thread ID 1) corresponding to the task 1, the thread (the thread ID 2) corresponding to the task 2, and the thread (the thread ID 3) corresponding to the task 3. Further, the computing device binds the thread corresponding to the task 1 to the core 1, binds the thread corresponding to the task 2 to the core 3, and controls the core 1 and the core 3 to run the corresponding threads, but not to run the thread corresponding to the task 3.

Through step 604 and step 605, the computing device implements the online isolation of the target core in a manner of first creating the thread and then binding the thread to the core. For example, this process is "the computing device controls the core other than the target core in the plurality of cores to execute an updated task, and brings the target core offline".

Through step 601 to step 605, when the binding relationship exists between the core and the task, after determining the faulty target core through fault detection, the computing device updates the core allocation information, to enable the second core in the target core group to execute the target task, and in a manner of first unbinding, then creating the thread, and then rebinding the thread to the core based on the updated core allocation information, the computing device controls the second core to run the thread based on the target thread identifier, to execute the target task, and finally brings the target core offline, to implement that the thread identifier corresponding to the target task remains unchanged before and after the faulty core is isolated online. This process may also be understood as follows: When the binding relationship exists between the core and the task, a task executed by the faulty core is allocated to a core in the target core group through dynamic core allocation, to implement online isolation of the faulty core. This improves the reliability of the processor, and implements the insensibility of the upper-layer application.

It should be understood that, in some embodiments, the computing device determines, in a manner similar to that in the embodiment shown in FIG. 2, after step 601 is performed to determine the target core, a quantity of offline cores is determined. When the quantity of offline cores is less than an offline quantity threshold, 602 to step 605 are performed. Details are not described herein again.

In addition, in the embodiment shown in FIG. 6, regardless of whether the target core belongs to the target core group, the second core is determined from the target core group to implement the online isolation of the target core. In some embodiments, when the target core does not belong to the target core group (that is, the target core belongs to the invariable core group), the second core is determined from the target core group to implement the online isolation of the target core. In some other embodiments, when the target core belongs to the target core group, the computing device directly brings the target core offline. For example, after performing step 601, the computing device determines, based on the core allocation information, a core group to which the target core belongs; and when the target core belongs to the target core group, the computing device updates an execution status of the target task in the core allocation information to non-execution status. This process may also be understood as follows: Because the target core group to which the target core belongs is the core group in which the quantity of cores can be reduced, the target core can be directly brought offline. This improves online isolation efficiency of the faulty core on a basis of ensuring that performance of the processor falls within a controllable range.

Figure 7:
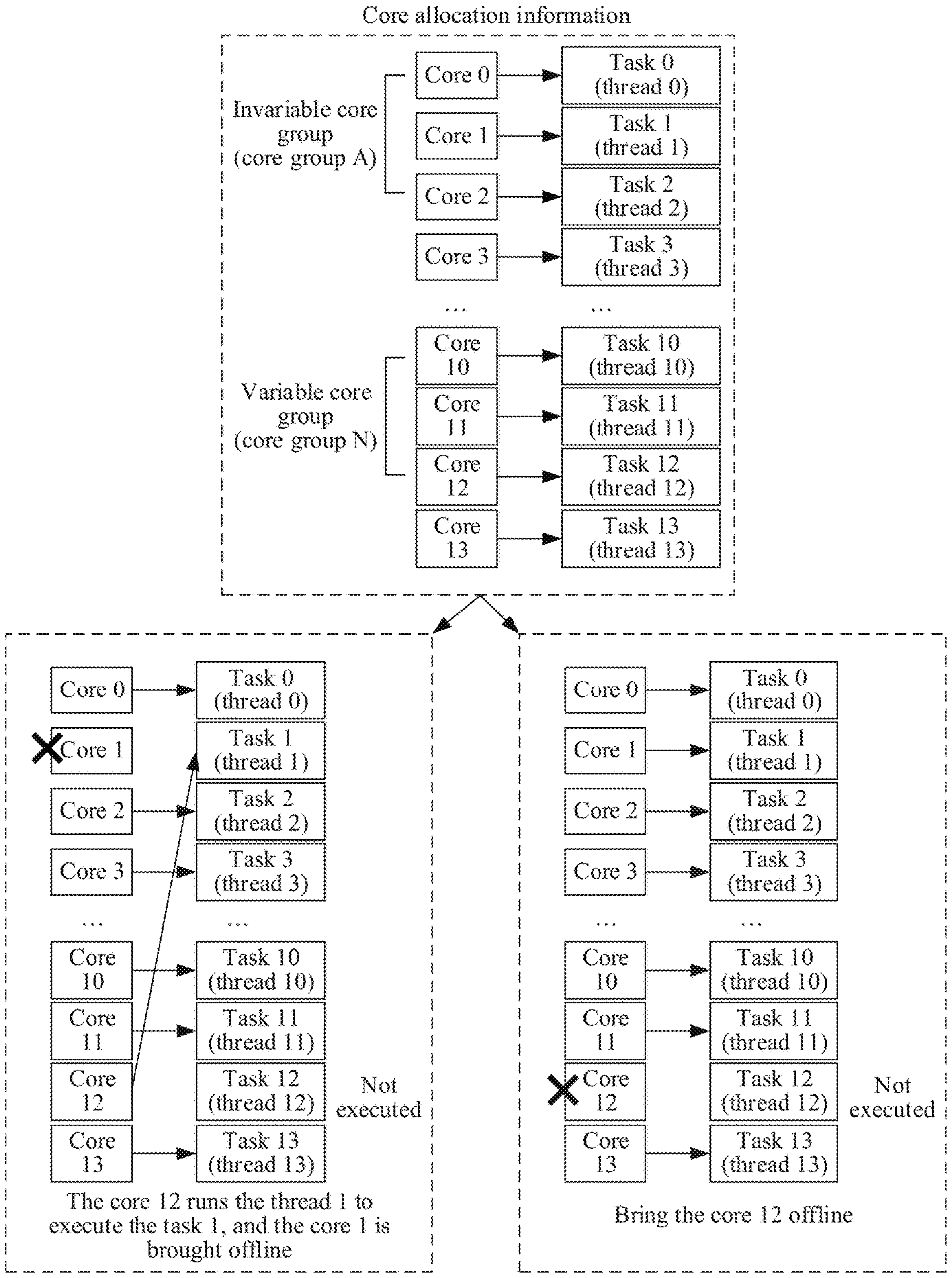
FIG. 7 is a diagram of another processor core fault handling method according to an embodiment of this application.

For example, the embodiment shown in FIG. 6 is described below with reference to FIG. 7. FIG. 7 is a diagram of another processor core fault handling method according to an embodiment of this application. As shown in FIG. 7, the plurality of cores of the processor include the variable core group (a core group N) and the invariable core group (a core group A), and the core allocation information indicates a core 0 to a core 13 to respectively run a thread 0 to a thread 13 to execute a task 0 to a task 13.

For example, when the core 1 is the faulty target core, because the core 1 belongs to the invariable core group, the computing device determines the core 12 from the variable core group based on the core allocation information, updates the core allocation information to enable the core 12 to execute the task 1, and updates an execution status of the task 12 in the core allocation information to non-execution status. Further, the computing device controls the core 0 to the core 13 to end current tasks, creates the thread 0 to the thread 13 based on a task indicated by the updated core allocation information and core IDs of the core 0 to the core 13, binds the thread 1 to the core 12, binds the thread 0, the thread 2 to the thread 11, and the thread 13 respectively to the core 0, the core 2 to the core 11, and the core 13, and controls the core 0 and the core 2 to the core 13 to run corresponding threads. For the thread 12, the computing device performs no processing, that is, does not run the thread 12, and finally brings the core 1 offline, to implement that the processor runs normally before and after the core 1 is isolated online. This improves the reliability of the processor.

For another example, when the core 12 is the faulty target core, because the core 12 belongs to the variable core group, the computing device updates an execution status of the task 12 in the core allocation information to non-execution status. Further, the computing device controls the core 0 to the core 13 to end current tasks, creates the thread 0 to the thread 13 based on a task indicated by the updated core allocation information and core IDs of the core 0 to the core 13, binds the thread 0 to the thread 11 and the thread 13 respectively to the core 0 to the core 11 and the core 13, and controls the core 0 to the core 11 and the core 13 to run corresponding threads. For the thread 12, the computing device performs no processing, that is, does not run the thread 12, and finally brings the core 12 offline, to implement that the processor runs normally before and after the core 12 is isolated online. This improves the reliability of the processor.

In conclusion, in the processor core fault handling method provided in embodiments of this application, when the binding relationship exists between the core and the task, the faulty target core is determined by performing fault detection on the plurality of cores of the processor, and the core allocation information is further updated to enable the second core in the target core group to execute the target task. In the manner of first unbinding, then creating the thread, and then rebinding the thread to the core based on the updated core allocation information, the second core is controlled to run the thread based on the target thread identifier, to execute the target task, and the target core is finally brought offline, to implement that the thread identifier corresponding to the target task remains unchanged before and after the faulty core is isolated online. This process may also be understood as follows: When the binding relationship exists between the core and the task, the task executed by the faulty core is allocated to the core in the target core group through dynamic core allocation, to implement the online isolation of the faulty core. This improves the reliability of the processor, and implements the insensibility of the upper-layer application.

Figure 8:
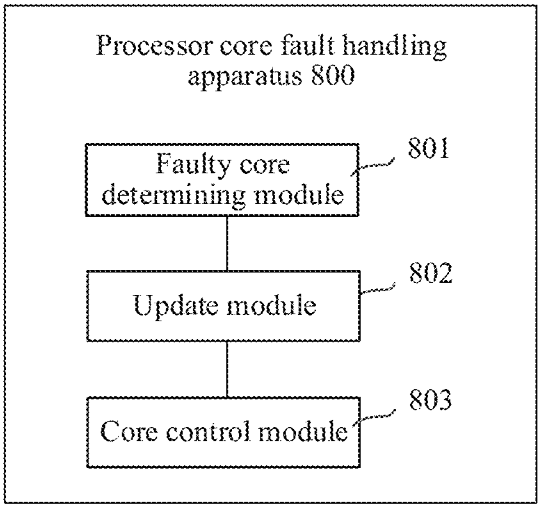
FIG. 8 is a diagram of a structure of a processor core fault handling apparatus according to an embodiment of this application.

FIG. 8 is a diagram of a structure of a processor core fault handling apparatus according to an embodiment of this application. The processor core fault handling apparatus may implement functions of the foregoing computing device by using software, hardware, or a combination thereof. The processor core fault handling apparatus provided in this embodiment of this application can implement the steps performed by the computing device in the foregoing method embodiments. As shown in FIG. 8, a processor core fault handling apparatus 800 includes: a faulty core determining module 801, an update module 802, and a core control module 803.

The faulty core determining module 801 is configured to perform fault detection on a plurality of cores of a processor to determine a faulty core as a target core;

the update module 802 is configured to: update, based on a target task executed by the target core, tasks executed by the plurality of cores, to enable a core other than the target core in the plurality of cores to execute the target task; and the core control module 803 is configured to: control the core other than the target core in the plurality of cores to execute an updated task, and bring the target core offline.

In an implementation, the update module 802 is configured to:

update, based on the target task, a core for executing the target task in core allocation information, where the core allocation information indicates the plurality of cores and the tasks executed by the plurality of cores; and the core control module 803 is configured to: control the core other than the target core in the plurality of cores to execute the task based on updated core allocation information, and bring the target core offline.

In an implementation, the core control module 803 is configured to:

control the plurality of cores to end current tasks, control the core other than the target core in the plurality of cores to execute the updated task, and bring the target core offline.

In an implementation, the update module 802 is configured to:

determine, based on the core allocation information, a first core from cores other than the target core in the plurality of cores; and update, based on the first core and the target task, the target task in the core allocation information to be executed by the first core.

In an implementation, the update module 802 is configured to:

determine, based on the core allocation information, a second core from a target core group; and update, based on the second core and the target task, the target task in the core allocation information to be executed by the second core, and update an execution status of a second task executed by the second core in the core allocation information to non-execution status.

In an implementation, the update module 802 is configured to perform any one of the following:

updating, based on a second core and the target task, the target task in the core allocation information to be executed by the second core by running a thread based on a target thread identifier, and updating the execution status of the second task in the core allocation information to non-execution status, where the target thread identifier is a thread identifier of a thread that is run by the target core when the target core executes the target task; and exchanging, based on the second core and the target task, the target task and the second task in the core allocation information, updating the target task in the core allocation information to be executed by the second core by running the thread based on the target thread identifier, and updating the second task in the core allocation information to creating a thread based on a core identifier of the second core without executing the second task.

In an implementation, the core control module 803 is configured to:

create a plurality of threads based on the updated core allocation information and core identifiers of the plurality of cores, where a thread identifier of a thread run by a second core is a target thread identifier; and bind a thread corresponding to the target task in the plurality of threads to the second core, and control the core other than the target core in the plurality of cores to run, based on the updated core allocation information, a thread other than a thread corresponding to a second task in the plurality of threads.

In an implementation, the update module 802 is configured to:

when the target core belongs to a target core group, update an execution status of the target task in the core allocation information to non-execution status.

In an implementation, the faulty core determining module 801 is configured to:

collect statistics on cache errors reported by the plurality of cores, to obtain first fault detection results of the plurality of cores, where the first fault detection result indicates a quantity of cache errors reported by the core; and if a first fault detection result of the target core indicates that a quantity of cache errors reported by the target core reaches a target threshold, determine that the target core is faulty.

In an implementation, the faulty core determining module 801 is configured to:

test at least one performance indicator of the plurality of cores, to obtain second fault detection results of the plurality of cores, where the second fault detection result indicates a test result corresponding to the performance indicator of the core; and if a second fault detection result of the target core indicates that a test result corresponding to at least one performance indicator of the target core is inconsistent with a target result, determine that the target core is faulty.

In an implementation, the update module 802 is configured to:

when a quantity of offline cores is less than an offline quantity threshold, update, based on the target task executed by the target core, the tasks executed by the plurality of cores, to enable the core other than the target core in the plurality of cores to execute the target task.

In the foregoing processor core fault handling apparatus, fault detection is performed on the plurality of cores of the processor to determine the faulty target core. Further, the tasks executed by the plurality of cores are updated based on the target task executed by the target core, to enable the core other than the target core in the plurality of cores to execute the target task. The core other than the target core in the plurality of cores is controlled to execute the updated task, and the target core is brought offline. This implements online isolation of the faulty core, so that the processor can run normally before and after the faulty core is isolated, and reliability of the processor is effectively improved.

It should be noted that, when the processor core fault handling apparatus provided in the foregoing embodiment performs processor core fault handling, division into the functional modules is only used as an example for description. During actual application, the functions may be allocated to different functional modules for implementation based on a requirement. That is, an inner structure of the apparatus is divided into different functional modules to implement all or some of the functions described above. In addition, the processor core fault handling apparatus provided in the foregoing embodiment and the processor core fault handling method embodiments pertain to a same concept. For a specific implementation process, refer to the method embodiments. Details are not described herein again.

It should be noted that information (including but not limited to user equipment information, personal information of a user, and the like), data (including but not limited to data used for analysis, stored data, displayed data, and the like), and signals in this application are used under authorization by the user or full authorization by all parties, and capturing, use, and processing of related data need to conform to related laws, regulations, and standards of related countries and regions. For example, the core allocation information and the like in this application are all obtained under full authorization.

In this application, terms such as "first" and "second" are used to distinguish between same items or similar items that have basically same effects and functions. It should be understood that there is no logical or time sequence dependency between "first", "second", and "nth". A quantity and an execution sequence are also not limited. It should also be understood that although the following descriptions use terms such as "first" and "second" to describe various elements, these elements should not be limited by the terms. These terms are simply used to distinguish one element from another element. For example, the first core may be referred to as the second core without departing from the scope of the various examples, and similarly, the second core may be referred to as the first core. The first core and the second core may both be cores, and in some cases, may be separate and different cores.

In this application, the term "at least one" means one or more, and the term "a plurality of" in this application means two or more. For example, a plurality of cores means two or more cores.

The foregoing descriptions are merely specific implementations of this application, but are not intended to limit the protection scope of this application. Any equivalent modification or replacement readily figured out by persons skilled in the art within the technical scope disclosed in this application shall fall within the protection scope of this application. Therefore, the protection scope of this application shall be subject to the protection scope of the claims.

All or some of the foregoing embodiments may be implemented by using software, hardware, firmware, or any combination thereof. When software is used for implementation, all or some of the embodiments may be implemented in a form of program structure information. The program structure information includes one or more program instructions. When the program instructions are loaded and executed on a computing device, all or some of the procedures or functions according to embodiments of this application are generated.

Persons of ordinary skill in the art may understand that all or some of the steps of the foregoing embodiments may be implemented by hardware or a program instructing related hardware. The program may be stored in a computer-readable storage medium. The storage medium may be a read-only memory, a magnetic disk, an optical disc, or the like.

It should be understood that, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof; and such modifications or replacements will not cause the essence of corresponding technical solutions to depart from the scope of the technical solutions in embodiments of this application.

What is claimed is:

1. A method, comprising:

performing fault detection on a plurality of cores of a processor to determine a target core that is faulty, the target core being one of the plurality of cores;

updating, based on a target task executed by the target core, tasks executed by the plurality of cores, to enable a core other than the target core in the plurality of cores to execute the target task; and controlling the core other than the target core in the plurality of cores to execute an updated task, and bringing the target core offline, wherein performing fault detection comprises invoking, by the target task, a test model to test at least one performance indicator of the plurality of cores, the test model being compiled and loaded into a target memory.

2. The method according to claim 1, wherein updating, based on the target task executed by the target core, the tasks executed by the plurality of cores, to enable the core other than the target core in the plurality of cores to execute the target task comprises:

updating, based on the target task, core allocation information to indicate that the core other than the target core is executing the target task, wherein the core allocation information indicates the plurality of cores and the tasks executed by the plurality of cores; and controlling the core other than the target core in the plurality of cores to execute the updated task, and bringing the target core offline comprises:

controlling the core other than the target core in the plurality of cores to execute the updated task based on the updated core allocation information, and bringing the target core offline.

3. The method according to claim 1, wherein controlling the core other than the target core in the plurality of cores to execute the updated task, and bringing the target core offline comprises:

controlling the plurality of cores to end current tasks, controlling the core other than the target core in the plurality of cores to execute the updated task, and bringing the target core offline.

4. The method according to claim 2, wherein updating, based on the target task, the core allocation information to indicate that the core other than the target core is executing the target task comprises:

determining, based on the core allocation information, a first core, other than the target core, from the plurality of cores; and updating, based on the first core and the target task, the core allocation information to indicate that the target task is executed by the first core.

5. The method according to claim 2, wherein updating, based on the target task, the core allocation information to indicate that the core other than the target core is executing the target task comprises:

determining, based on the core allocation information, a second core from a target core group; and updating, based on the second core and the target task, the core allocation information to indicate that the target task is executed by the second core, and updating an execution status, in the core allocation information, of a second task executed by the second core to non-execution status.

6. The method according to claim 5, wherein updating, based on the second core and the target task, the core allocation information to indicate that the target task is executed by the second core, and updating the execution status, in the core allocation information, of the second task executed by the second core to non-execution status comprises one of the following:

updating, based on the second core and the target task, the core allocation information to indicate that the target task is executed by the second core by running a thread based on a target thread identifier, and updating the execution status, in the core allocation information, of the second task to non-execution status, wherein the target thread identifier is a thread identifier of a thread that is run by the target core when the target core executes the target task; or exchanging, based on the second core and the target task, the target task and the second task in the core allocation information, updating the core allocation information to indicate that the target task is executed by the second core by running the thread based on the target thread identifier, and updating the core allocation information to indicate the second task is creating a thread based on a core identifier of the second core without executing the second task.

7. The method according to claim 5, wherein controlling the core other than the target core in the plurality of cores to execute the task based on the updated core allocation information comprises:

creating a plurality of threads based on the updated core allocation information and core identifiers of the plurality of cores, wherein a thread identifier of a thread run by the second core is a target thread identifier; and binding a thread corresponding to the target task in the plurality of threads to the second core, and controlling the core other than the target core in the plurality of cores to run, based on the updated core allocation information, a thread other than a thread corresponding to the second task in the plurality of threads.

8. The method according to claim 2, wherein updating, based on the target task, the core allocation information to indicate that the core other than the target core is executing the target task comprises:

when the target core belongs to a target core group, updating an execution status of the target task in the core allocation information to non-execution status.

9. The method according to claim 1, wherein performing fault detection on the plurality of cores of the processor to determine the target core that is faulty comprises:

collecting statistics on cache errors reported by the plurality of cores, to obtain first fault detection results of the plurality of cores, wherein the first fault detection results indicates a quantity of cache errors reported by the target core; and determining, when the first fault detection results of the target core indicates that the quantity of cache errors reported by the target core reaches a target threshold, that the target core is faulty.

10. The method according to claim 1, wherein performing fault detection on the plurality of cores of the processor to determine the target core that is faulty comprises:

testing the at least one performance indicator for each of the plurality of cores, to obtain second fault detection results of the plurality of cores, wherein the second fault detection results indicates a test result corresponding to the at least one performance indicator of the target core; and determining, when the second fault detection results of the target core indicates that the test result corresponding to the at least one performance indicator of the target core is inconsistent with a target result, that the target core is faulty.

11. The method according to claim 1, wherein updating, based on the target task executed by the target core, the tasks executed by the plurality of cores, to enable the core other than the target core in the plurality of cores to execute the target task comprises:

updating, based on the target task executed by the target core, when a quantity of offline cores is less than an offline quantity threshold, the tasks executed by the plurality of cores, to enable the core other than the target core in the plurality of cores to execute the target task.

12. A computing device comprising at least one processor and a memory, the at least one processor comprising a plurality of cores, the plurality of cores including a target core, and the memory storing a computer program that, when executed by the at least one processor, causes the computing device to perform:

detecting a fault on the plurality of cores of a processor to determine that the target core is faulty;

updating, based on a target task executed by the target core, tasks executed by the plurality of cores, to enable a core other than the target core in the plurality of cores to execute the target task; and controlling the core other than the target core in the plurality of cores to execute an updated task, and bringing the target core offline, wherein detecting the fault comprises invoking, by the target task, a test model to test at least one performance indicator of the plurality of cores, the test model being compiled and loaded into a target memory.

13. The computing device according to claim 12, wherein the at least one processor is configured to perform:

updating, based on the target task, core allocation information to indicate that the core other than the target core is executing the target task, wherein the core allocation information indicates the plurality of cores and the tasks executed by the plurality of cores; and controlling the core other than the target core in the plurality of cores to execute an updated task, and bringing the target core offline comprises:

controlling the core other than the target core in the plurality of cores to execute the updated task based on the updated core allocation information, and bringing the target core offline.

14. The computing device according to claim 12, wherein the at least one processor is configured to perform:

controlling the plurality of cores to end current tasks, controlling the core other than the target core in the plurality of cores to execute the updated task, and bringing the target core offline.

15. The computing device according to claim 13, wherein the at least one processor is configured to perform:

determining, based on the core allocation information, a first core other than the target core, from the plurality of cores; and updating, based on the first core and the target task, the core allocation information to indicate that the target task is executed by the first core.

16. The computing device according to claim 13, wherein the at least one processor is configured to perform:

determining, based on the core allocation information, a second core from a target core group; and updating, based on the second core and the target task, the core allocation information to indicate that the target task is executed by the second core, and updating an execution status, in the core allocation information, of a second task executed by the second core to non-execution status.

17. The computing device according to claim 13, wherein the at least one processor is configured to perform when the target core belongs to a target core group, updating an execution status of the target task in the core allocation information to non-execution status.

18. The computing device according to claim 12, wherein the at least one processor is configured to perform collecting statistics on cache errors reported by the plurality of cores, to obtain first fault detection results of the plurality of cores, wherein the first fault detection results indicates a quantity of cache errors reported by the target core; and determining, when the first fault detection results of the target core indicates that the quantity of cache errors reported by the target core reaches a target threshold, that the target core is faulty.

19. The computing device according to claim 12, wherein the at least one processor is configured to perform testing the at least one performance indicator for each of the plurality of cores, to obtain second fault detection results of the plurality of cores, wherein the second fault detection results indicates a test result corresponding to the at least one performance indicator of the target core; and determining, when the second fault detection results of the target core indicates that the test result corresponding to the at least one performance indicator of the target core is inconsistent with a target result, that the target core is faulty.

20. A non-transitory computer readable medium comprising program instructions that, when run on a computing device, cause the computing device to perform:

performing fault detection on a plurality of cores of a processor to determine a target core that is faulty, the target core being one of the plurality of cores;

updating, based on a target task executed by the target core, tasks executed by the plurality of cores, to enable a core other than the target core in the plurality of cores to execute the target task; and controlling the core other than the target core in the plurality of cores to execute an updated task, and bringing the target core offline, wherein performing fault detection comprises invoking, by the target task, a test model to test at least one performance indicator of the plurality of cores, the test model being compiled and loaded into a target memory.

* * * * *